(12) United States Patent
Okamoto et al.

(10) Patent No.: US 10,137,847 B2
(45) Date of Patent: Nov. 27, 2018

(54) EXTERIOR WIRING HARNESS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Ryouya Okamoto, Mie (JP); Hiroki Hirai, Mie (JP); Tetsuji Tanaka, Mie (JP); Hiroomi Hiramitsu, Mie (JP); Hiroshi Shimizu, Mie (JP); Hitoshi Takeda, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 0 days.

(21) Appl. No.: 15/559,863

(22) PCT Filed: Mar. 16, 2016

(86) PCT No.: PCT/JP2016/058286
§ 371 (c)(1),
(2) Date: Sep. 20, 2017

(87) PCT Pub. No.: WO2016/158409
PCT Pub. Date: Oct. 6, 2016

(65) Prior Publication Data
US 2018/0056896 A1    Mar. 1, 2018

(30) Foreign Application Priority Data
Mar. 31, 2015    (JP) .................................. 2015-071803

(51) Int. Cl.
  *H01B 7/08*    (2006.01)
  *B60R 16/02*    (2006.01)

(52) U.S. Cl.
  CPC ....... *B60R 16/0215* (2013.01); *H01B 7/0892* (2013.01)

(58) Field of Classification Search
  CPC ......................... B60R 16/0207; H01B 7/0892
  See application file for complete search history.

(56) References Cited

U.S. PATENT DOCUMENTS 5,348,084 A * 9/1994 Fay ....................... E21B 17/206
                                                                166/65.1
6,051,789 A    4/2000 Kato
(Continued)

FOREIGN PATENT DOCUMENTS

JP    9-144499    * 6/1997
JP    10-257634    9/1998
(Continued)

OTHER PUBLICATIONS

International Search Report dated Apr. 26, 2016.

*Primary Examiner* — Hung V Ngo
(74) *Attorney, Agent, or Firm* — Gerald E. Hespos; Michael J. Porco; Matthew T. Hespos

(57) ABSTRACT

It is aimed to provide an exterior wiring harness which can be routed in a flat space formed between a plurality of electrical members. An exterior wiring harness (10) includes a plurality of wires (11) and an exterior body (12) formed by surrounding outer peripheries of the plurality of wires (11) by a sheet (13) made of fibrous synthetic resin. The exterior body (12) includes a flat portion (15) having a flat cross-sectional shape and other parts (14) connected to the flat portion (15) and different from the flat portion. A length (L1) of the flat portion (15) in a minor axis direction is set to be smaller than a width of a clearance formed between a (Continued)

plurality of electrical members. A maximum value (L3) of the other parts (14) in the minor axis direction of the flat portion is set to be larger than the width of the clearance.

4 Claims, 12 Drawing Sheets

(56) References Cited

U.S. PATENT DOCUMENTS

| | | | | |
|---|---|---|---|---|
| 6,173,101 | B1* | 1/2001 | Bourghelle | G02B 6/4403 385/114 |
| 6,559,389 | B1* | 5/2003 | Kornrumpf | H01B 7/0892 174/254 |
| 8,287,303 | B2* | 10/2012 | Chuo | H01B 7/0892 174/254 |
| 2008/0314657 | A1 | 12/2008 | Ikeda et al. | |
| 2010/0263926 | A1 | 10/2010 | Murayama et al. | |
| 2011/0267798 | A1* | 11/2011 | Nakazaki | H01B 7/0892 361/827 |
| 2014/0326479 | A1* | 11/2014 | Itani | B60R 16/0215 174/68.3 |
| 2015/0107748 | A1* | 4/2015 | Suzuki | H01B 13/0129 156/50 |
| 2016/0250984 | A1* | 9/2016 | Gottschlich | B23K 20/1295 307/10.1 |

FOREIGN PATENT DOCUMENTS

| | | |
|---|---|---|
| JP | 2009-4323 | 1/2009 |
| JP | 2009-179117 | 8/2009 |
| JP | 2014-68458 | 4/2014 |

* cited by examiner

EXTERIOR WIRING HARNESS

BACKGROUND

Field of the Invention

The invention relates to an exterior wiring harness.

Description of the Related Art

Japanese Unexamined Patent Publication No. 2009-4323 discloses an electrical device equipped with a wiring harness. This electrical device is a power supply device with a battery assembly including a plurality of batteries. The battery assembly is connected to an electrical connection box. Electrical components are disposed in the electrical connection box. Although not shown in detail, a wiring harness provides connections between the battery assembly and the electrical components or among the electrical components. However, the use of the wiring harness for the connections between the battery assembly (electrical member) and the electrical components (electrical members) or among the electrical components complicates the routing of the wiring harness and expands a routing space for the wiring harness.

The invention was completed based on the above situation and aims to provide an exterior wiring harness that can be routed in a flat space formed between electrical members.

SUMMARY

The invention is directed to an exterior wiring harness with wires and an exterior body formed by surrounding outer peripheries of the wires by a sheet made of fibrous synthetic resin. The exterior body includes a flat portion having a flat cross-sectional shape and another part connected to the flat portion and different from the flat portion. A length of the flat portion in a minor axis direction is set to be smaller than a width of a clearance formed between a plurality of electrical members, and a maximum value of the other part in the minor axis direction of the flat portion is larger than the width of the clearance.

According to the present invention, the length of the flat portion in the minor axis direction is smaller than the width of the clearance formed between the electrical members. This enables the flat portion to be disposed in that clearance. Thus, even if the exterior wiring harness is configured to include the other part that is different from the flat portion and cannot be disposed in that clearance, the exterior wiring harness can be routed in a flat space formed between the electrical members via the flat portion. As a result, space efficiency for routing the plurality of wires can be improved.

The other part may include a circular portion having a circular cross-sectional shape.

A substantially circular cross-sectional shape is obtained by bundling the wires and winding the wires with a tape, or the like. The circular portion is formed by surrounding the bundled wires bundled with the exterior body and forming the exterior body into a circular cross-sectional shape. Providing the exterior body with the flat portion and the circular portion improves a degree of freedom in designing a routing space for the wires.

The flat portion may include a folding portion extending along an extending direction of the exterior body and a joined portion formed by joining end parts of the sheet folded at the folding portion to each other. Thus, the flat portion can be formed by a simple method of folding the folding portion and joining the end parts of the folded sheet to each other.

According to the invention, an exterior wiring harness can be routed in a flat space formed between a plurality of electrical members.

DETAILED DESCRIPTION

A first embodiment of the invention is described with reference to FIGS. 1 to 8. Note that, in the following description, one member may be denoted with reference sign and the other members may not be denoted with reference sign for a plurality of members having the same shape.

An exterior wiring harness 10 according to this embodiment is disposed in a vehicle (not shown), such as an automotive vehicle, electric vehicle or hybrid vehicle. In the case of disposition in an electric or hybrid vehicle, the exterior wiring harness 10 is used for wiring in a battery pack (not shown) serving as a drive source of the electric or hybrid vehicle or wiring between the battery pack and devices (not shown) such as an inverter and a motor. Note that the battery pack includes a cell module with a plurality of battery cells (not shown) and an ECU (Electronic Control Unit) for managing and controlling voltages and the like of the battery cells.

Figure 1:
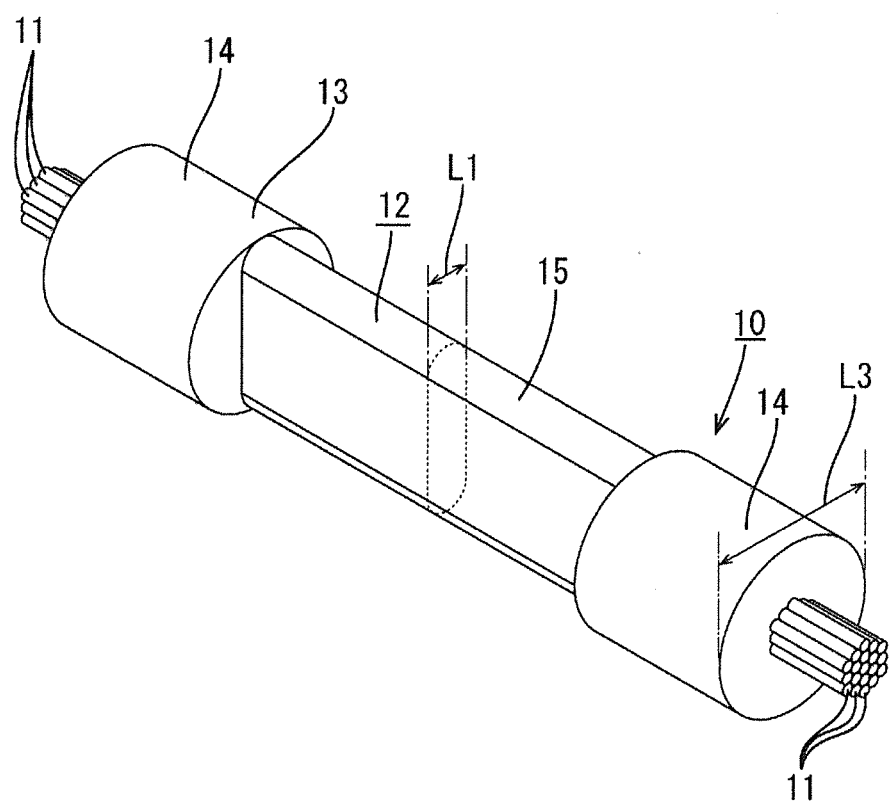
FIG. 1 is a perspective view showing an exterior wiring harness according to a first embodiment.

As shown in FIG. 1, the exterior wiring harness 10 includes wires 11 and an exterior body 12 surrounding the wires 11. The outer peripheries of the wires 11 are surrounded by the exterior body 12 formed of a sheet 13 made of fibrous synthetic resin. Each wire 11 has a circular cross-section and includes a core (not shown) and an insulation coating (insulation layer) covering around the core. The core is made of copper, copper alloy or aluminum alloy and, for example, a twisted wire obtained by twisting a plurality of metal strands or a single-core wire.

A thickness of the sheet 13 is set appropriately according to a material. For example, aramid fibers, glass fibers, cellulose fibers, nylon fibers, vinylon fibers, polyester fibers, polyolefin fibers, rayon fibers and the like can be used as the material of the sheet 13.

Synthetic resin that can be partially or entirely melted or softened through a heating process and, thereafter, cured through a cooling process can be used as synthetic resin constituting the sheet 13. Synthetic resin containing base fibers and adhesive resin (also called binder) can be used as such synthetic resin. The adhesive resin is resin having a lower melting point than the base fibers. By heating the sheet 13 to a temperature lower than the melting point of the base fibers and higher than the melting point of the adhesive resin, the adhesive resin is melted to infiltrate between the base fibers. Thereafter, when the temperature of the sheet 13 decreases, the adhesive resin is solidified. In this way, the sheet 13 can be maintained in a molded state during heating. Here, the sheet 13 (also called nonwoven fabric) formed into a sheet-like shape is used.

The base fibers of the sheet 13 only have to maintain a fibrous state at the melting point of the adhesive resin and various fibers can be used besides resin fibers. Further, thermoplastic resin fibers having a melting point lower than that of the base fibers can be used as the adhesive resin. For example, a combination of the base fibers and the adhesive resin is a combination of PET (polyethylene terephthalate) resin fibers as the base fibers and copolymer resin of PET and PEI (polyethylene isophthalate) as the adhesive resin.

The exterior body 12 includes circular portions (an example of an "other part different from a flat portion") 14 having a circular cross-section in a plane perpendicular to an extending direction of the wires 11 and a flat portion 15 having a flat cross-sectional shape in a plane perpendicular to the extending direction of the wires 11. In the circular portion 14, the wires 11 are bundled to have a circular cross-section. The circular portion 14 is cured by so-called hot pressing. Note that hot pressing means a process of molding a thermoplastic material by sandwiching the thermoplastic material to be processed between molds 16A and 16B and applying a pressure with the molds 16A, 16B heated.

The flat portion 15 may be hot-pressed to be cured or may not be hot-pressed. Further, even when hot-pressing is performed, the flat portion 15 may be in a semi-cured state softer than the circular portion 14. In other words, the flat portion 15 may be flexible or may have mechanical strength by being cured.

The cross-sectional shape of the flat portion 15 can be a rectangular shape (excluding a square shape), an oval shape, an elliptical shape or any arbitrarily shape if necessary. Further, the rectangular shape may have chamfered ridges or rounded ridges. A cross-sectional area of the flat portion 15 is smaller than that of other parts of the exterior body 12 connected to the flat portion 15 and different from the flat portion 15. In this embodiment, the cross-sectional area of the flat portion 15 is smaller than that of the circular portions 14.

Figure 2:
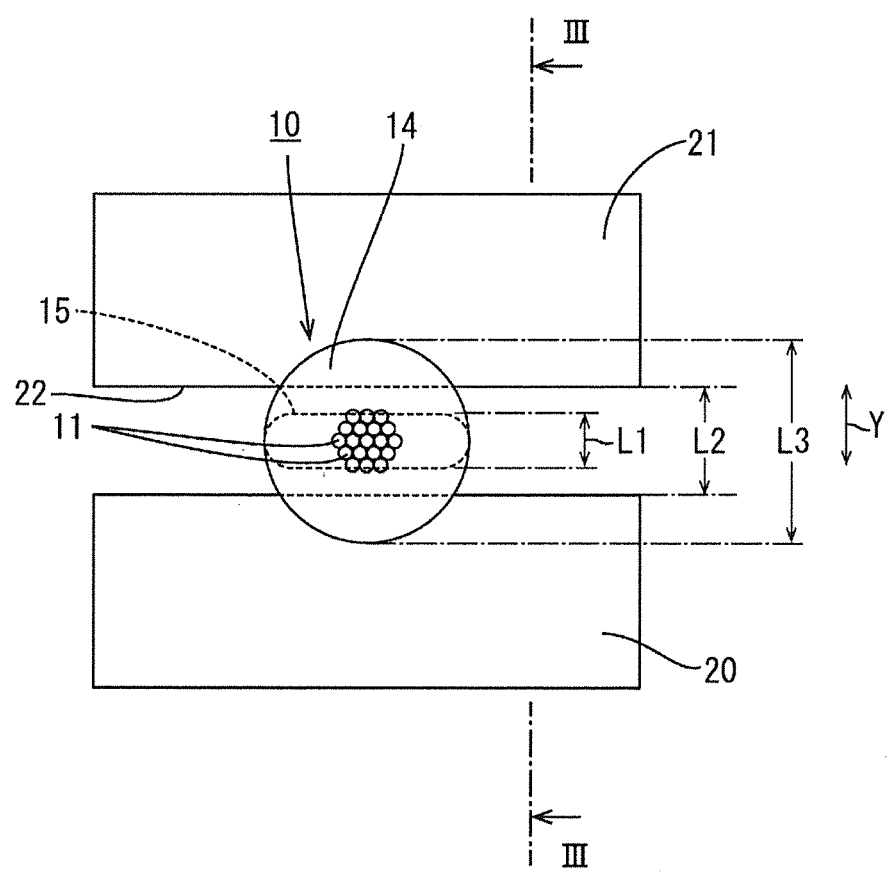
FIG. 2 is a front view showing a state where a flat portion is disposed in a clearance formed between first and second electrical members.
Figure 3:
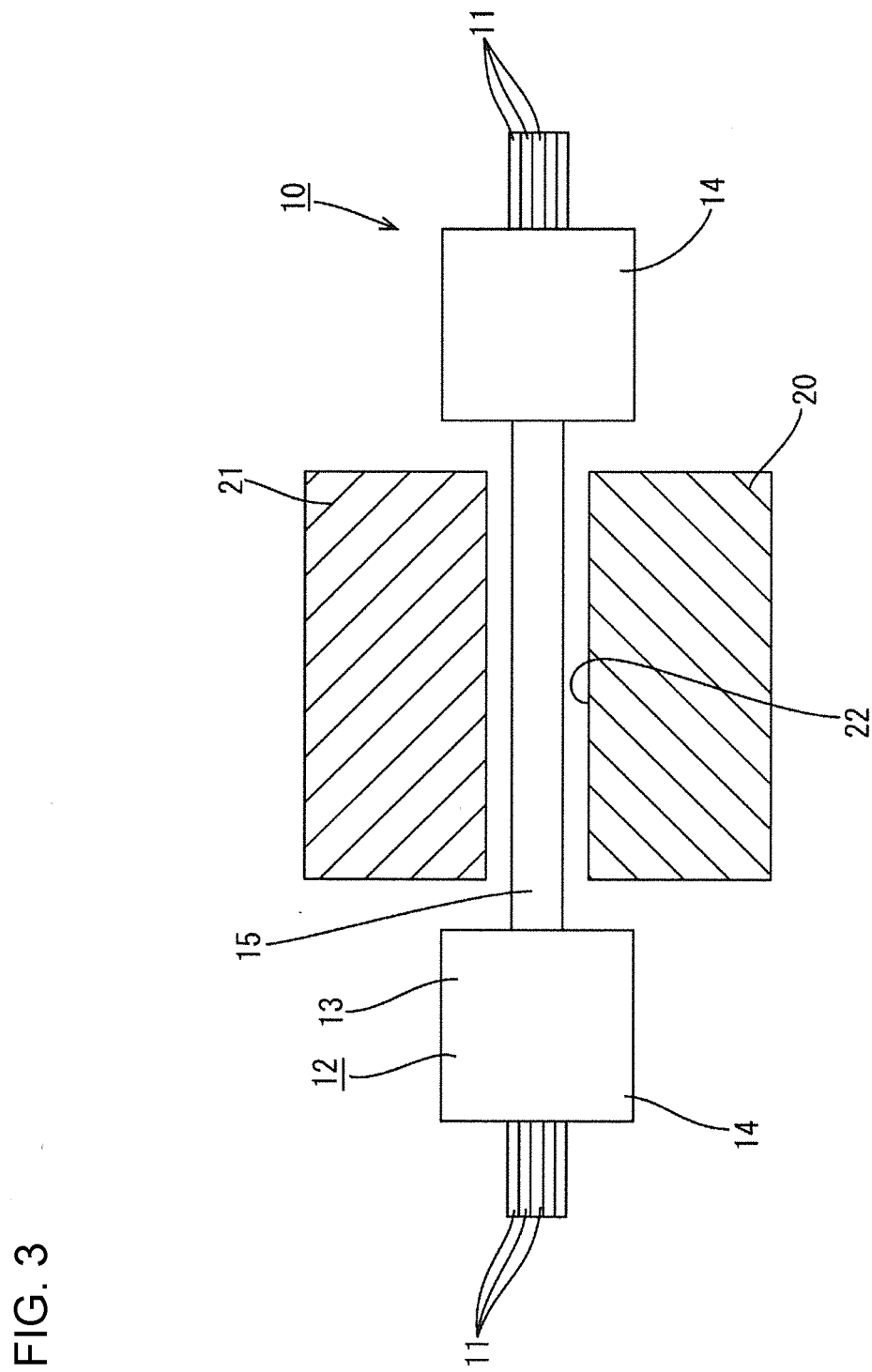
FIG. 3 is a section along III-III of FIG. 2.

As shown in FIGS. 2 and 3, the flat portion 15 of the exterior wiring harness 10 is disposed in a flat clearance 22 formed between a first electrical member 20 and a second electrical member 21 vertically spaced apart from each other. Examples of the first electrical member 20 located below include a cell module. Further, examples of the second electrical member 21 located above include an ECU.

As shown in FIG. 2, the flat portion 15 is disposed in such an orientation that a minor axis direction is aligned with a vertical direction. A vertical thickness of the flat portion 15, i.e. a length L1 of the flat portion 15 in the minor axis direction (arrow directions Y of FIG. 2), is set to be smaller than a vertical distance of the clearance 22 formed between the two electrical members 20, 21 disposed one above the other, i.e. a width L2 of the clearance. Further, the width L2 of the clearance 22 is smaller than a diameter L3 of the circular portion 14. In other words, the diameter L3 of the circular portion 14 is larger than the width L2 of the clearance. Here, the diameter L3 of the circular portion 14 is an example of a "maximum value of the other part in the minor axis direction of the flat portion".

Note that the width L2 of the clearance is determined to be a predetermined value according to an installation space and the like for the two electrical members 20, 21. The length L1 of the flat portion 15 in the minor axis direction is set at a predetermined value smaller than the width L2 of the clearance according to the determined width L2 of the clearance. For example, if the width L2 of the clearance is determined to be 15 mm, the length L1 of the flat portion 15 in the minor axis direction is, for example, set at 12 mm.

(Manufacturing Process of Embodiment)

Next, an example of a manufacturing process of the exterior wiring harness 10 according to this embodiment is described. Note that the manufacturing process of this embodiment is not limited to the following process.

(Circular Portions 14)

Figure 4:
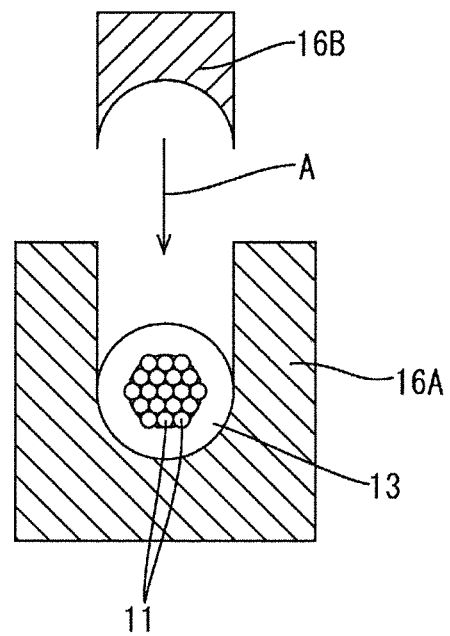
FIG. 4 is a section showing an example of a circular portion manufacturing process.

As shown in FIG. 4, the circular portions 14 can be formed by so-called hot-pressing. Specifically, the wires 11 are bundled to have a circular cross-section. Then, the outer periphery of the bundle of wires 11 is surrounded with the sheet 13. Subsequently, the sheet 13 is molded into a predetermined shape by relatively moving the other mold 16B closer to one mold 16A in a direction shown by an arrow A of FIG. 4 while the molds 16A, 16B are heated. Note that the molds 16A, 16B are not limited to the pair of molds 16A, 16B and may be composed of three or more divided molds.

(Flat Portion 15)

Figure 5:
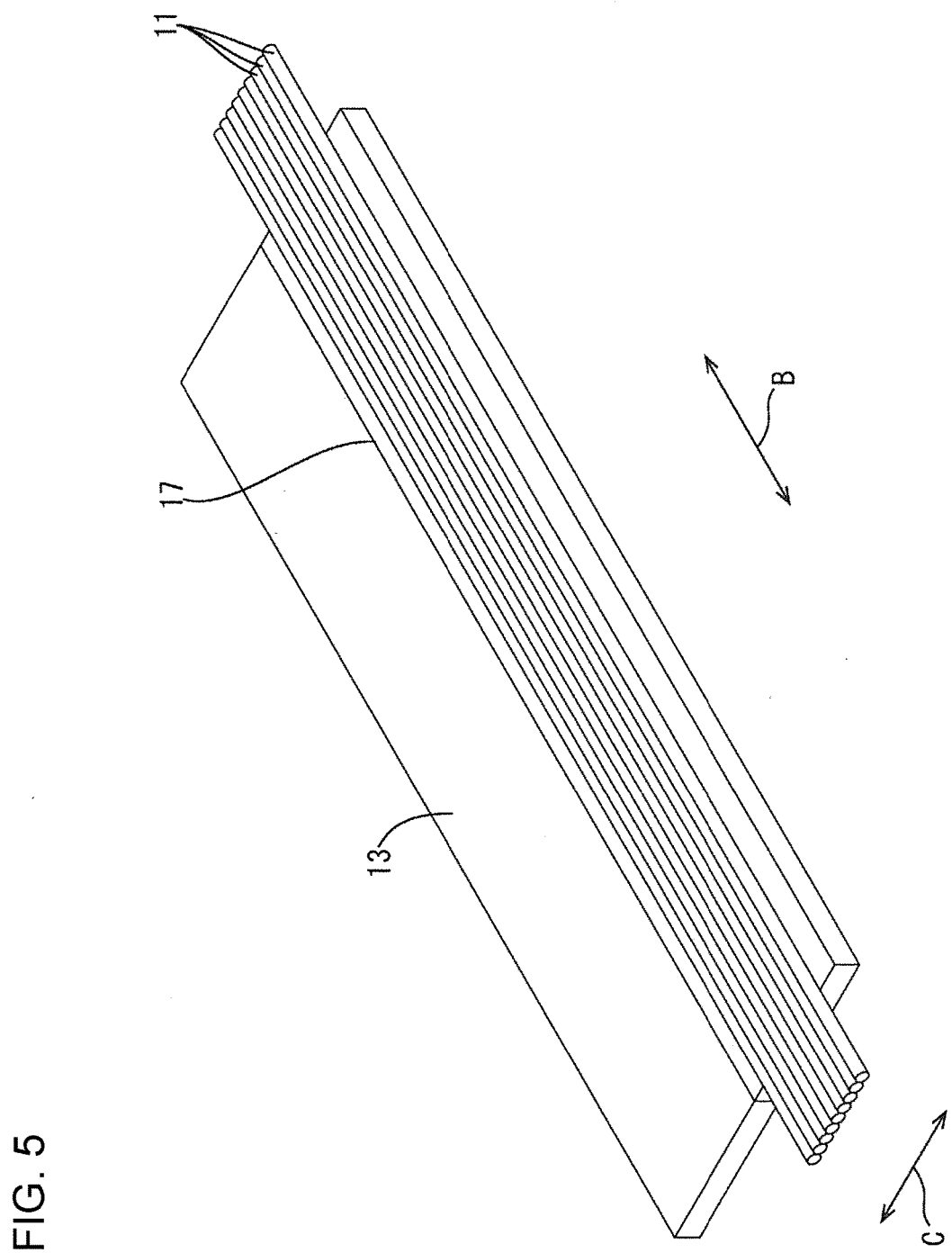
FIG. 5 is a perspective view showing an example of a flat portion manufacturing process.
Figure 6:
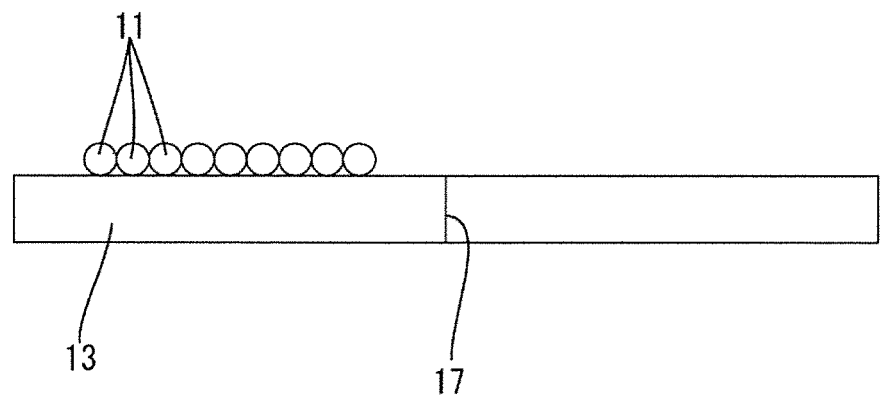
FIG. 6 is a front view showing the example of the flat portion manufacturing process.

FIGS. 5 to 8 show an example of a manufacturing process of the flat portion 15. First, as shown in FIG. 5, the sheet 13 is placed and the plurality of wires 11 are placed on the sheet 13. The sheet 13 is disposed such that a longitudinal direction thereof is aligned with the extending direction of the wires 11 (directions shown by arrows B in FIG. 5). The sheet 13 includes a folding portion 17 extending along the longitudinal direction (extending direction of the wires 11) at a position near a center in a direction (directions shown by arrows C in FIG. 5) intersecting with the longitudinal direction (extending direction of the wires 11).

Figure 7:
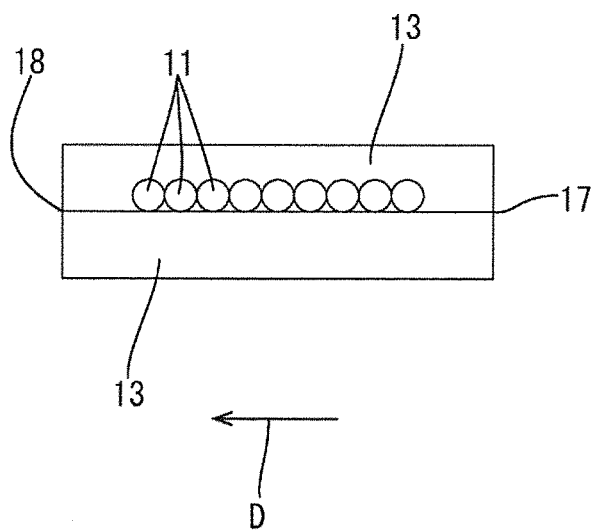
FIG. 7 is a front view showing a state where a sheet is folded at a folding portion.

As shown in FIG. 7, the folding portion 17 is folded with the wires 11 placed on the sheet 13. Then, the wires 11 are sandwiched from upper and lower sides and surrounded by the sheet 13 folded at the folding portion 17.

Subsequently, end parts of the sheet 13 in a folding direction (direction shown by an arrow D in FIG. 7) are overlapped and joined to each other to surround the wires 11 (see FIG. 8). In other words, end parts of the sheet 13 located on a side opposite to the folding portion 17 in the direction intersecting with the longitudinal direction (extending direction of the wires 11) and overlapping one above the other are joined by a known method such as thermal fusion, adhesion, metal riveting or resin riveting. A part of the sheet 13 where the end parts are joined to each other serves as a joined portion 18.

Thermal fusion may be performed by sandwiching the overlapped end parts of the sheet 13 from upper and lower sides by a pair of tools and heating upper and lower end parts or may be performed by applying ultrasonic vibration by a pair of tools.

Further, the sheet 13 may be hot-pressed in a state folded at the folding portion 17 by being sandwiched from upper and lower sides by a pair of molds (not shown).

(Functions and Effects of Embodiment)

According to this embodiment, the flat portion 15 of the exterior wiring harness 10 including the wires can be disposed in the flat clearance 22 formed between the first and second electrical members 20, 21 arranged one above the other and smaller than the diameter L3 of the circular portions 14. In this way, even if the exterior wiring harness 10 includes the circular portions 14 (other part different from the flat portion) that cannot be arranged in the clearance 22, the exterior wiring harness 10 can be routed in the flat space (clearance) 22 formed between a plurality of (two in this embodiment) electrical members (20, 21) via the flat portion 15. As a result, space efficiency for routing the wires 11 can be improved. Specifically, the width L2 of the clearance 22 can be shortened as compared to the case where the exterior wiring harness does not include the flat portion 15.

A known flexible flat cable has conductors sandwiched by films made of insulating synthetic resin and is known as a flat conductor. However, the films of this flexible flat cable are ripped easily by an external force, and there is a problem that the flexible flat cable is poor in durability.

In this respect, the exterior wiring harness 10 according to this embodiment includes the exterior body 12 for surrounding the wires 11 by the sheet 13 made of fibrous synthetic resin. The sheet 13 can absorb an external force and, therefore, has excellent durability.

Further, if the wires 11 are bundled by winding, for example, a tape, to obtain a substantially circular cross-sectional shape. The circular portions 14 are formed by surrounding the bundled wires 11 with the exterior body 12 and forming the exterior body 12 into a circular cross-sectional shape. By providing the exterior body 12 with the flat portion 15 and the circular portions 14 in this way, a degree of freedom in designing the routing space for the wires 11 is improved.

Further, the flat portion 15 includes the folding portion 17 extending along an extending direction of the exterior body 12 and the joined portion 18 formed by joining the end parts of the sheet 13 folded at the folding portion 17 to each other. In this way, the flat portion 15 of the exterior body 12 can be formed by a simple method of folding the folding portion 17 and joining the end parts of the folded sheet 13.

<Modifications>

Figure 9:
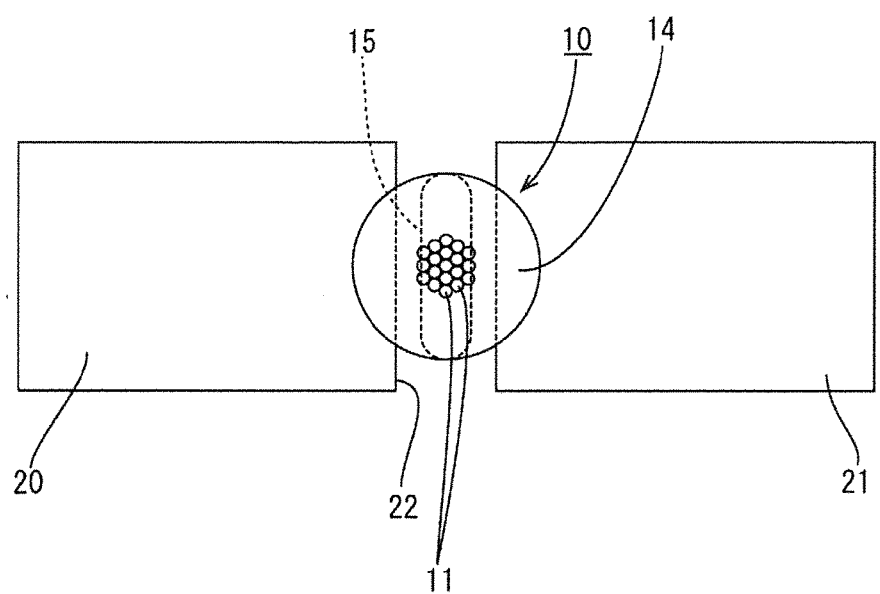
FIG. 9 is a front view showing a state where a flat portion of an exterior wiring harness according to a modification is disposed in a clearance formed between first and second electrical members.
Figure 10:
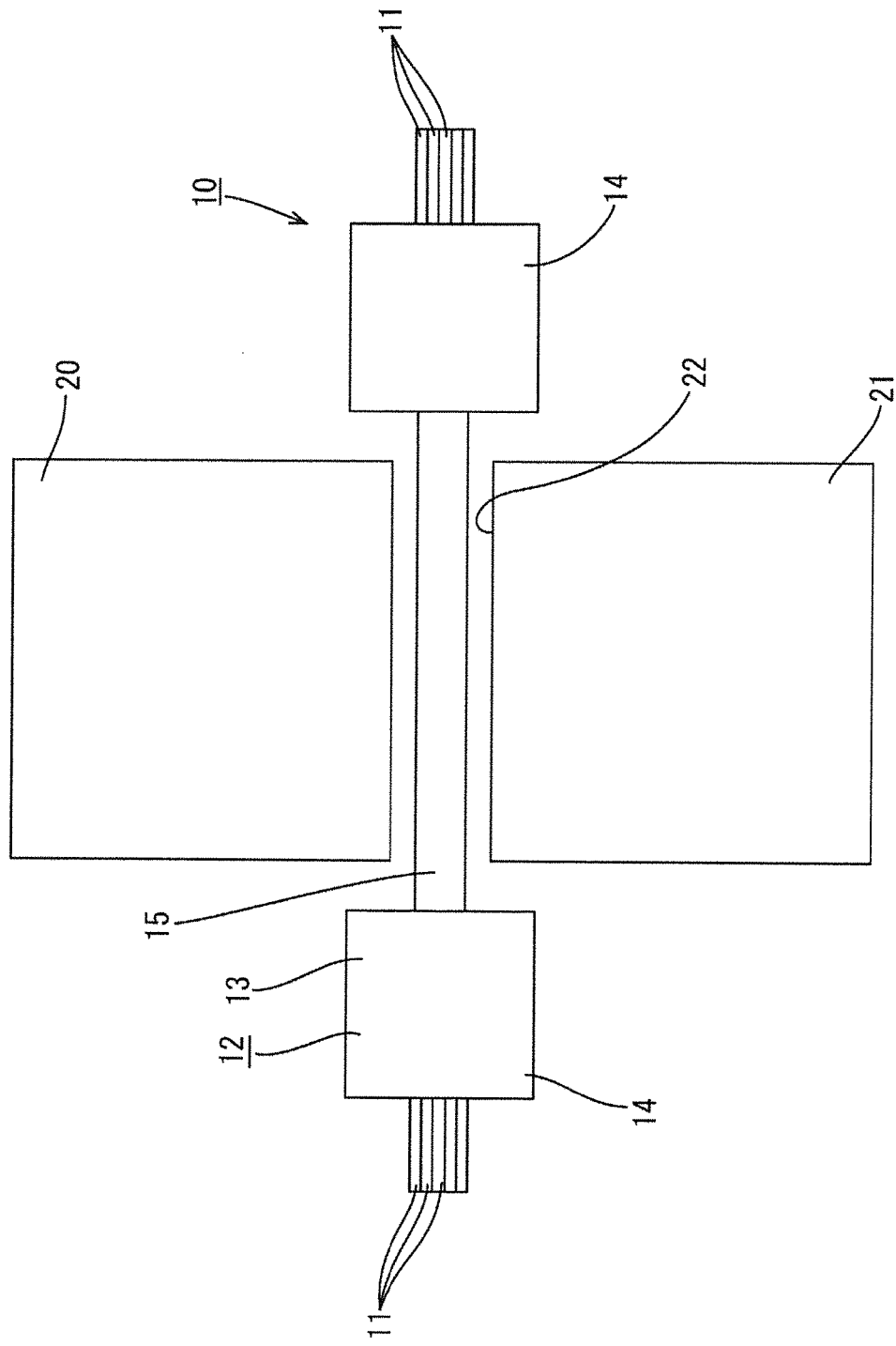
FIG. 10 is a plan view showing the state where the flat portion of the exterior wiring harness according to the modification is disposed in the clearance formed between the first and second electrical members.

Next, a modification of the first embodiment is described with reference to FIGS. 9 and 10. In this modification, a first electrical member 20 and a second electrical member 21 are disposed with a clearance 22 defined therebetween in a lateral direction. An exterior wiring harness 10 according to this modification is disposed in such an orientation that a minor axis part of the flat portion 15 is aligned with a horizontal direction.

As just described, according to this modification, the exterior wiring harness 10 can be disposed in the clearance 22 formed between the first and second electrical members 20, 21 disposed with the clearance 22 defined therebetween in the lateral direction. The first and second electrical members 20, 21 arranged as described above are, for example, a cell module and an electrical connection box disposed with the clearance 22 defined therebetween in the lateral direction.

Since the configuration other than the above is substantially the same as in the first embodiment, the same members are denoted by the same reference signs and repeated description is omitted.

The invention is not limited to the above described and illustrated embodiment. For example, the following embodiments are also included in the technical scope of the present invention.

Although the flat portion 15 is formed in a part of the exterior body 12 in the above embodiment, there is no limitation to this and a plurality of flat portions 15 may be formed at intervals in the exterior body 12.

Although the other part of the exterior body 12 different from the flat portion 15 is the circular portion 14 in the above embodiment, there is no limitation to this and a cross-sectional shape of the other part of the exterior body 12 different from the flat portion 15 may be a polygonal shape such as a triangular shape or rectangular shape.

Although the exterior wiring harness 10 is disposed between two electrical members 20, 21 in the above embodiment, there is no limitation to this and the exterior wiring harness 10 may be disposed in clearances formed between three or more electrical members.

The members disposed with the clearance defined therebetween are not limited to a cell module, an ECU and an electrical connection box. For example, these members may be electrical devices, such as a fuse box and a relay box, or may be structures, such as an upper wall, a side wall, a bottom wall and the like of a battery pack.

The manufacturing process of the exterior wiring harness 10 is not limited to the one described in the embodiment and may be as follows.

Figure 11:
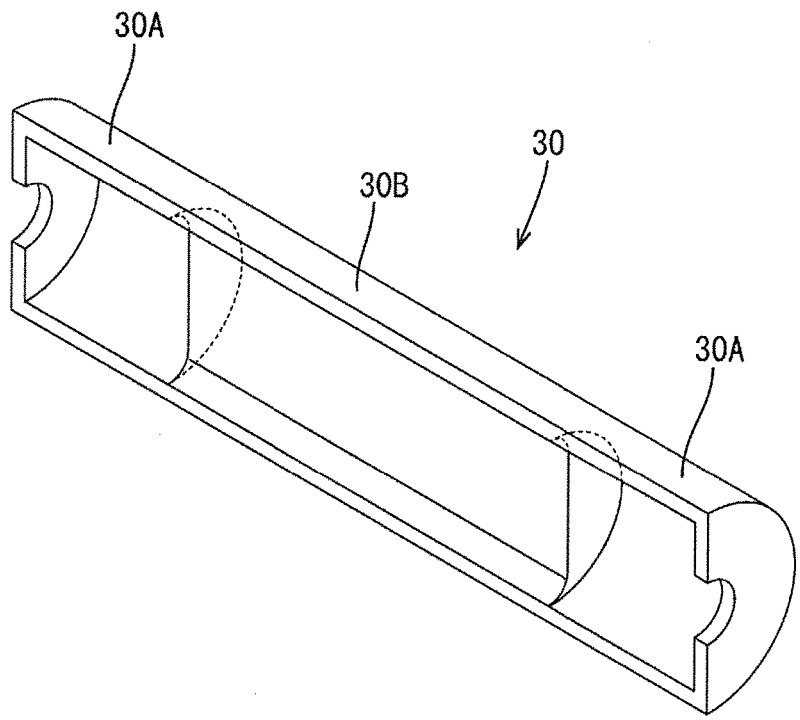
FIG. 11 is a schematic perspective view showing an example of a mold used in another manufacturing process.

The exterior wiring harness 10 shown in FIG. 1, can be manufactured by preparing two molds 30, as shown in FIG. 11. The mold 30 includes circular mold parts 30A for forming the circular portions 14 of the exterior wiring harness 10 and a flat mold part 30B for forming the flat portion 15.

Figure 12:
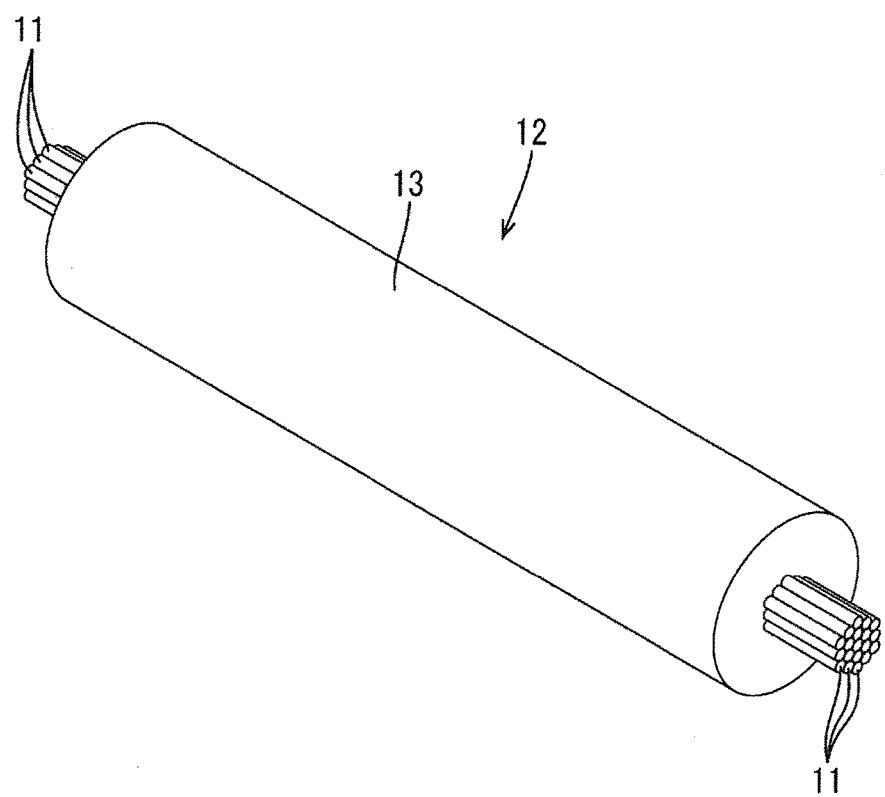
FIG. 12 is a perspective view showing an example of the other manufacturing process of the exterior wiring harness.

The wires 11 are bundled to have a circular cross-section. Then, the outer periphery of the bundle of the wires 11 is surrounded with the sheet 13 to form the exterior body 12 cylindrical, as shown in FIG. 12. Subsequently, the cylindrical exterior body 12 is sandwiched by the pair of molds 30 and the cylindrical exterior wiring harness is molded into the exterior wiring harness 10 shaped as shown in FIG. 1 by heating and pressing (hot pressing). This hot pressing process using the pair of molds 30 enables the circular portions 14 and the flat portion 15 shown in FIG. 1 to be formed simultaneously.

Note that the mold 30 is not limited to the one shown in FIG. 11. Further, the hot pressing process is also not limited to the above one. For example, a pair of molds each composed only of a flat mold part 30B may be prepared and only a part of the cylindrical exterior body 12 corresponding to the flat portion 15 may be heated and pressed.

Figure 13:
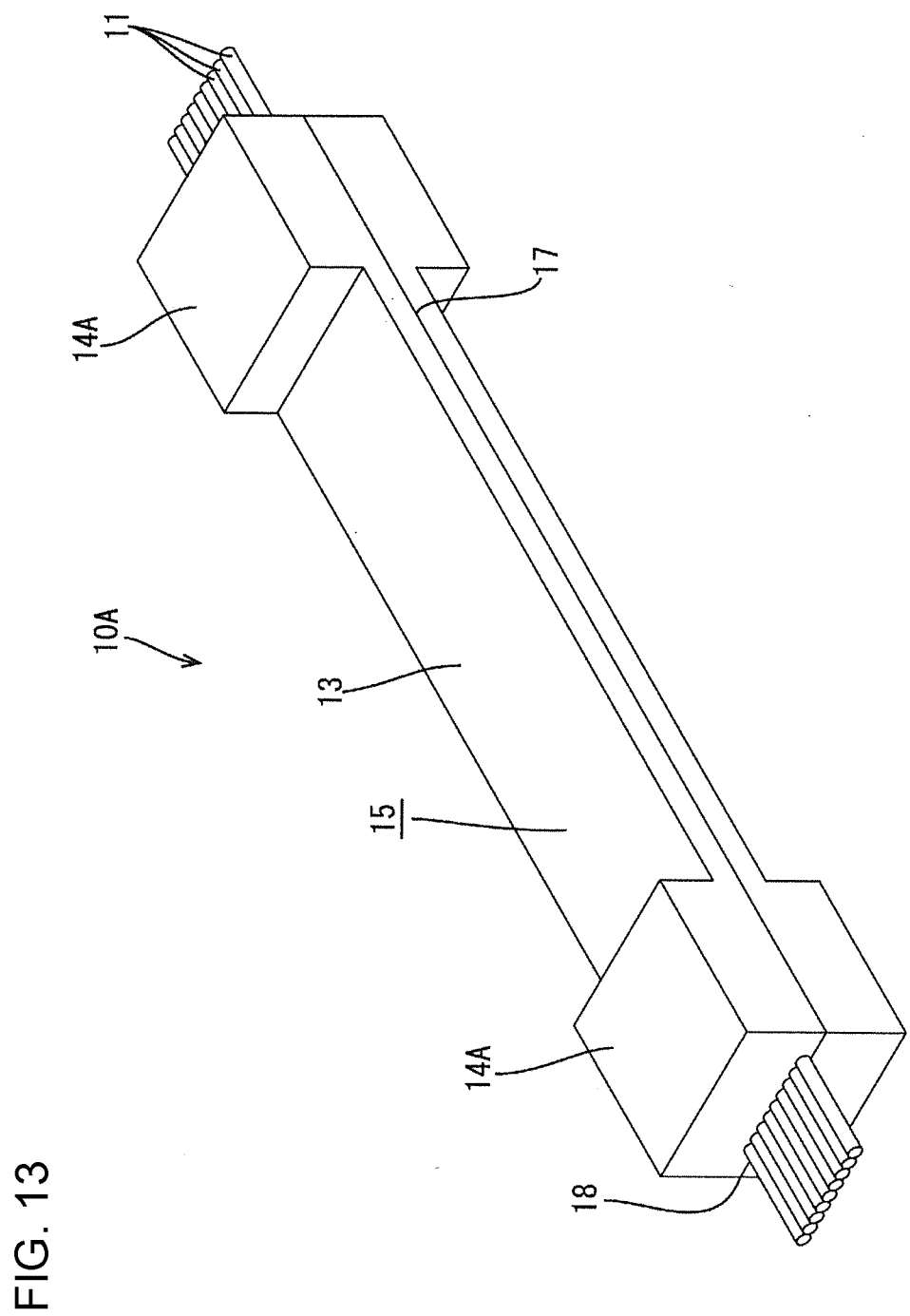
FIG. 13 is a perspective view showing an exterior wiring harness according to another embodiment.

The shape of the exterior wiring harness is not limited to the one shown in the embodiment and, for example, may be the shape of an exterior wiring harness 10A as shown in FIG. 13. In this case, rectangular portions 14A are formed instead of the circular portions 14 of the embodiment as the "other parts different from the flat portion". A manufacturing process in this case is, for example, as follows.

Figure 8:
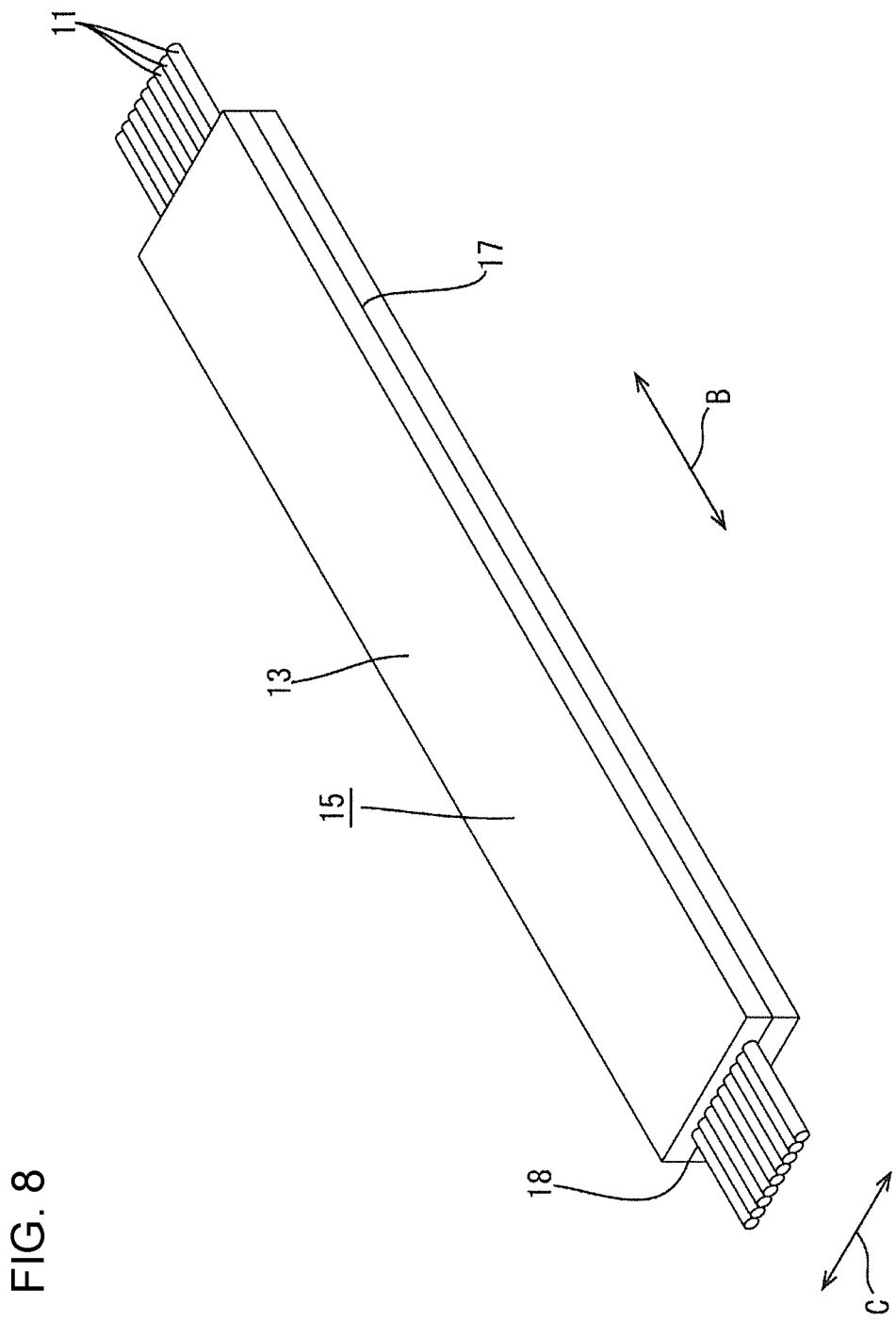
FIG. 8 is a perspective view showing the flat portion.
Figure 14:
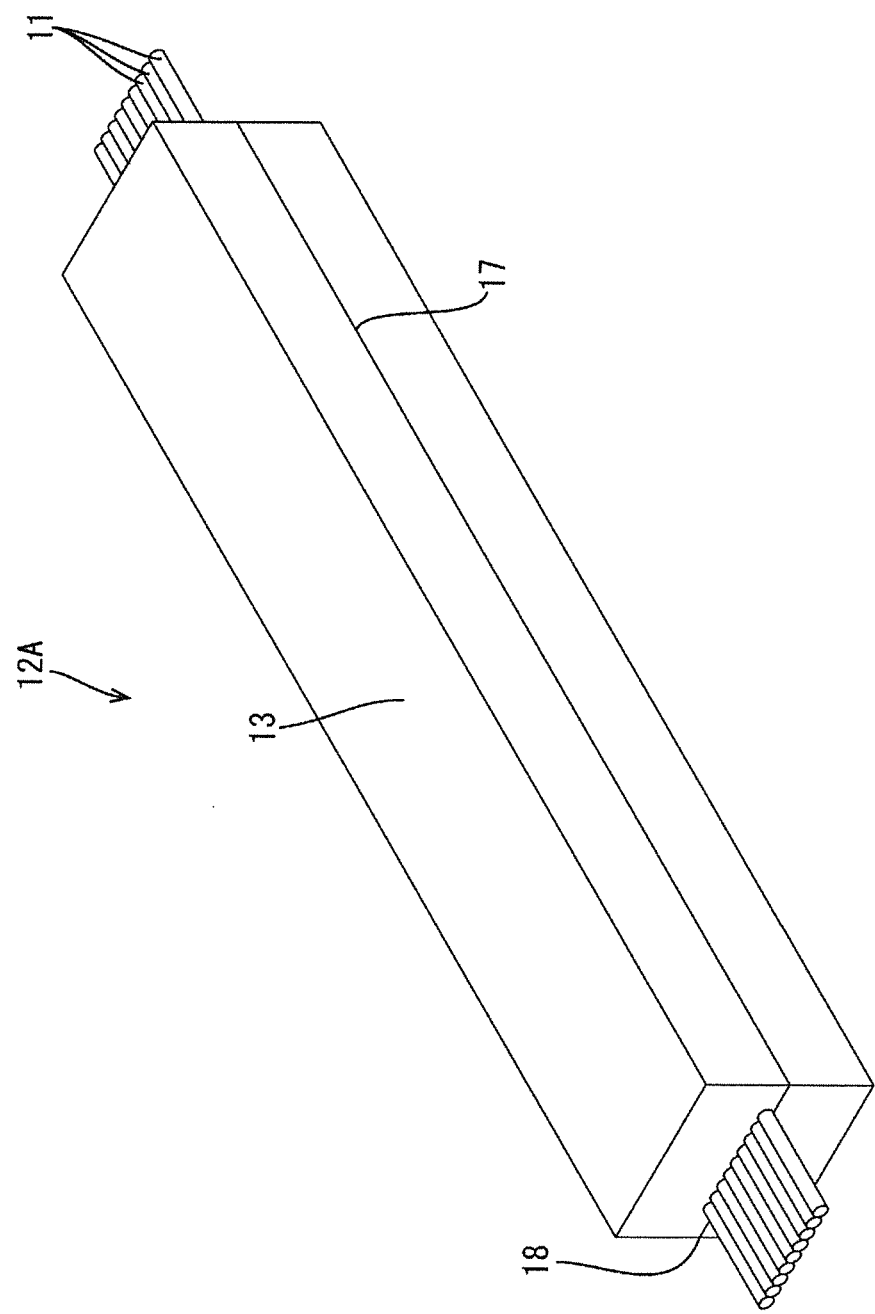
FIG. 14 is a perspective view showing an example of a manufacturing process of the exterior wiring harness of FIG. 13.

First, an exterior body 12A in which end parts of a sheet 13 are joined and a plurality of wires 11 are surrounded by the sheet 13 as shown in FIG. 14 is prepared by a manufacturing method similar to the manufacturing method of the flat portion 15 of the embodiment shown in FIG. 8. Subsequently, the exterior body 12A shown in FIG. 14 is hot-pressed by a pair of molds capable of simultaneously forming the rectangular portions 14A and the flat portion 15 as shown in FIG. 11 to form the exterior wiring harness 10A shown in FIG. 13. Note that the hot pressing process is not limited to this. For example, only a part of the exterior body 12A corresponding to the flat portion 15 may be hot-pressed by a pair of molds for hot-pressing only the part of the exterior body 12A corresponding to the flat portion 15.

Furthermore, the exterior wiring harness shaped, as shown in FIG. 1, may be formed from the exterior body 12A as shown in FIG. 14 using the molds as shown in FIG. 11.

LIST OF REFERENCE SIGNS

10: exterior wiring harness
11: wire
12: exterior body
13: sheet
14: circular portion
15: flat portion
17: folding portion
18: joined portion
20: first electrical member
21: second electrical member
22: clearance

The invention claimed is:

1. An exterior wiring harness to be routed through a clearance having a specified clearance width and a specified clearance length, comprising:
a plurality of wires; and
an exterior body formed by surrounding outer peripheries of the plurality of wires by a fibrous synthetic resin, wherein:
the exterior body includes opposite first and second longitudinal ends spaced from one another in an extending direction of the plurality of wires and having an outer surface between the ends, the outer surface being configured to define a flat portion spaced from the first and second longitudinal ends of the exterior body and having a flat cross-sectional shape the flat portion having a minor width smaller than the clearance width, a major width larger than the clearance width and a length greater than the clearance length, the exterior body further including a first end portion extending from the flat portion to the first longitudinal end of the exterior body and a second end portion extending from the flat portion to the second longitudinal end of the exterior body, the first and second end portions having cross-sectional dimensions greater than the minor width of the flat portion, and wherein the fibrous synthetic resin extends out from the wires to the exterior surface of the exterior body.

2. The exterior wiring harness of claim 1, wherein each of the end portions has a circular cross-sectional shape.

3. The exterior wiring harness of claim 2, wherein the flat portion includes a folding portion extending along an extending direction of the exterior body and a joined portion formed by joining end parts of the sheet folded at the folding portion to each other.

4. The exterior wiring harness of claim 1, wherein the flat portion includes a folding portion extending along an extending direction of the exterior body and a joined portion formed by joining end parts of the sheet folded at the folding portion to each other.

* * * * *